O. KLUGE.
HARVESTER.
APPLICATION FILED MAR. 28, 1912.

1,092,721.

Patented Apr. 7, 1914.
6 SHEETS—SHEET 1.

Fig. 1

Otto Kluge
Inventor, by C. A. Snow & Co.
Attorneys

Witnesses

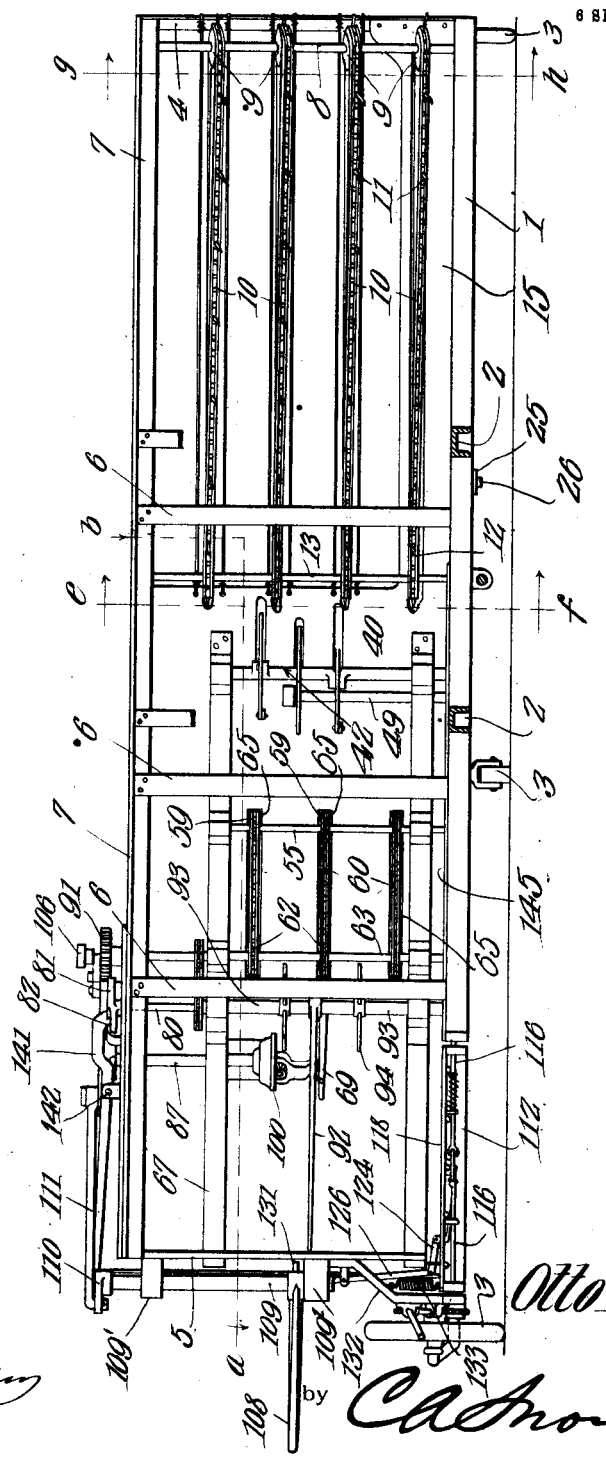

O. KLUGE.
HARVESTER.
APPLICATION FILED MAR. 28, 1912.
1,092,721.
Patented Apr. 7, 1914.
6 SHEETS—SHEET 3.
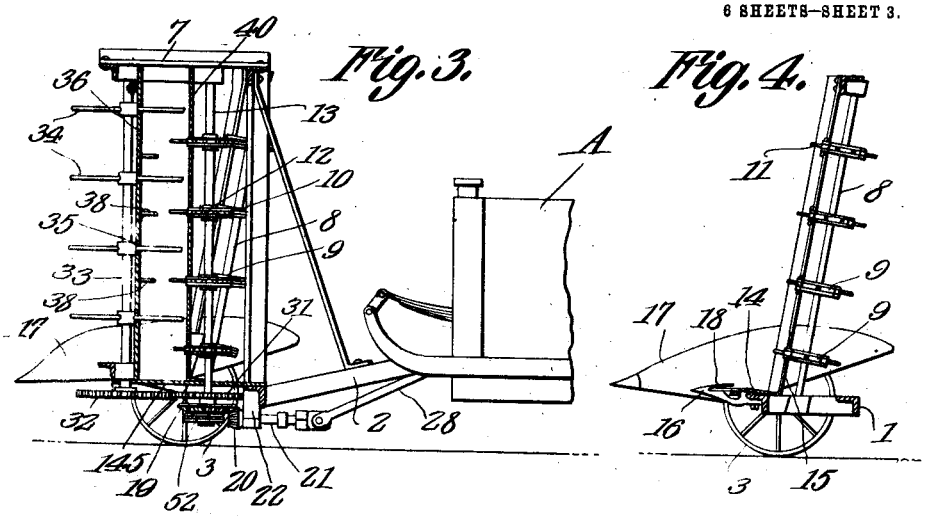
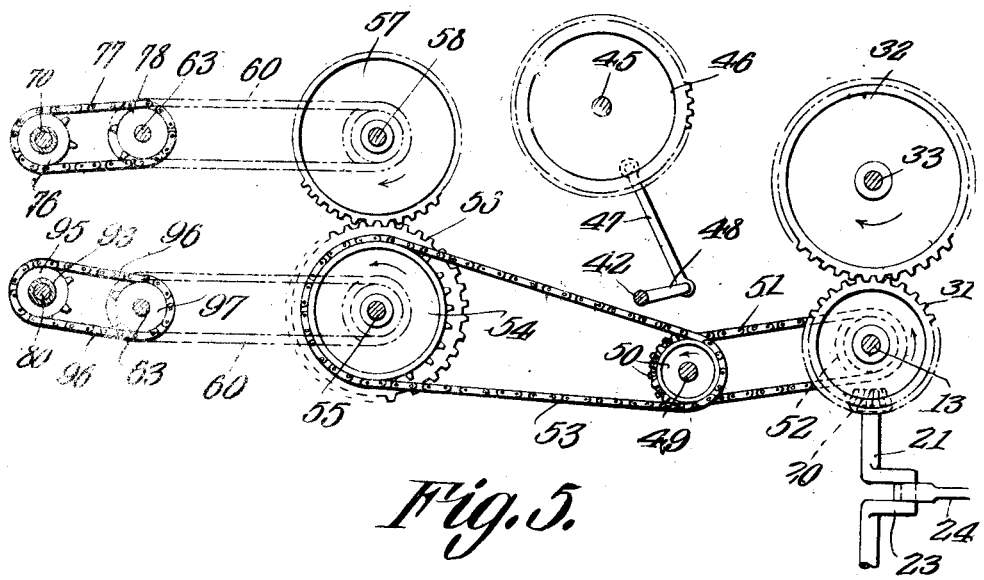
Witnesses
Otto Kluge
Inventor
by C. A. Snow & Co.
Attorneys O. KLUGE.
HARVESTER.
APPLICATION FILED MAR. 28, 1912.
1,092,721.
Patented Apr. 7, 1914.
6 SHEETS—SHEET 4.
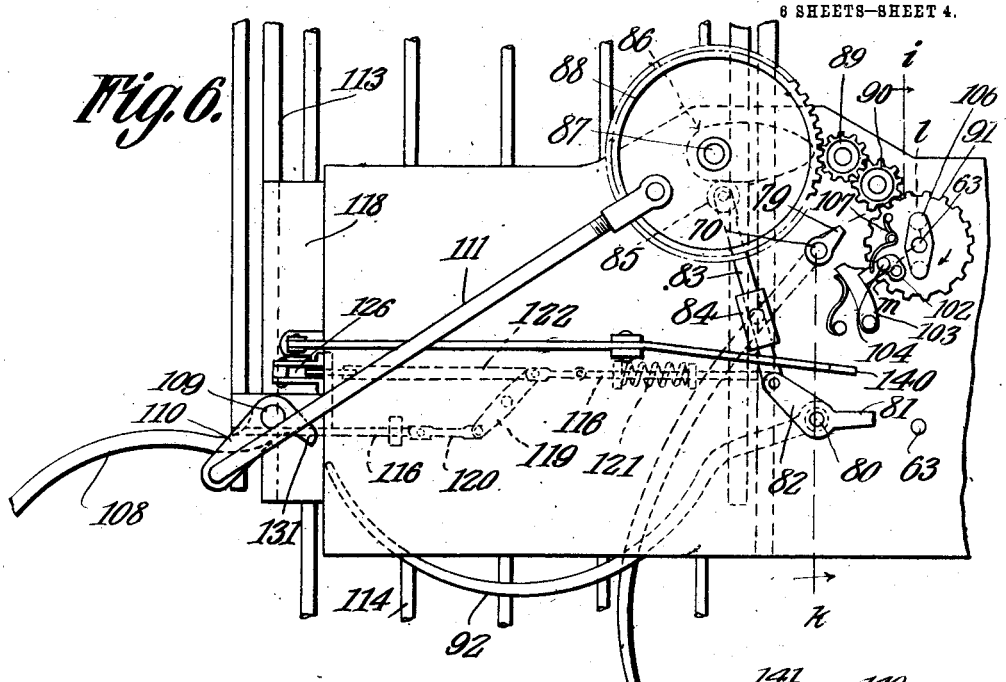
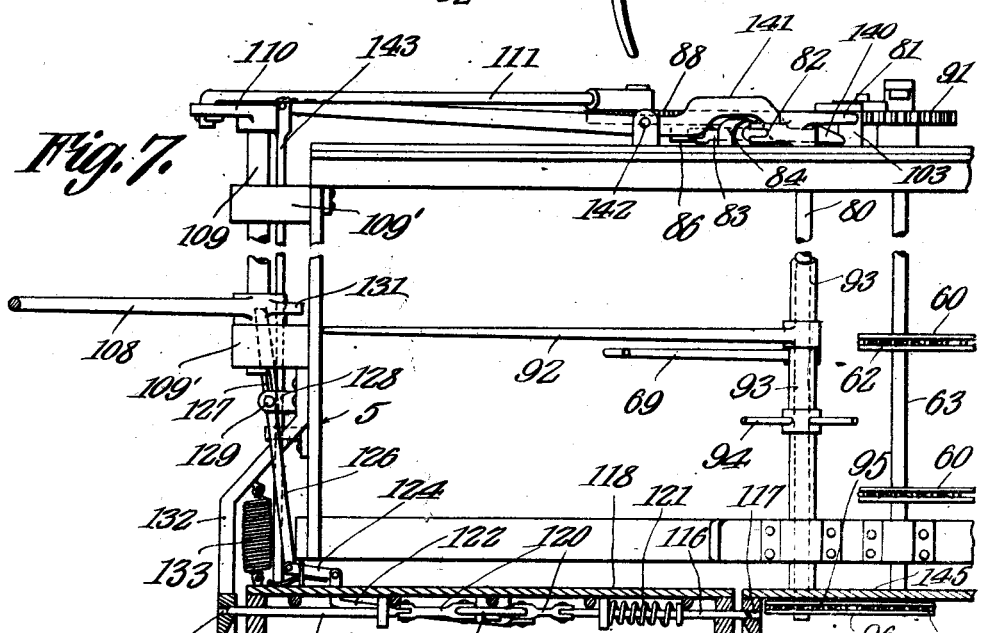
Otto Kluge Inventor,

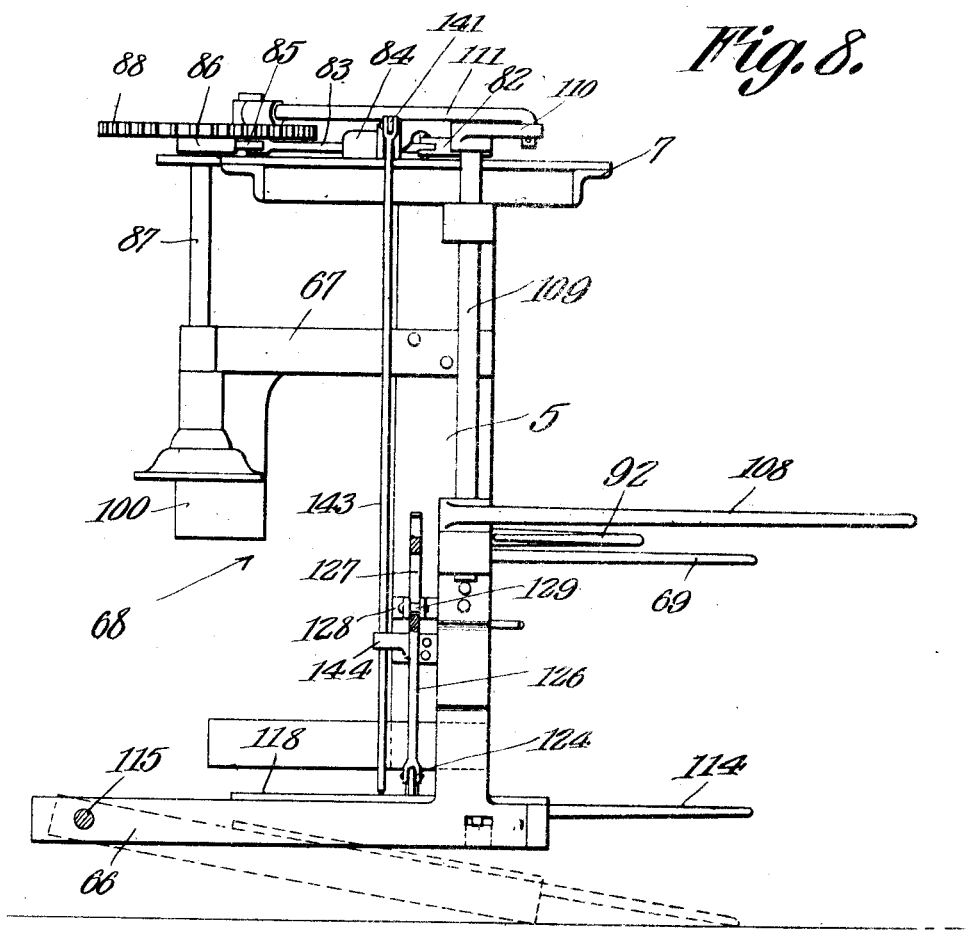

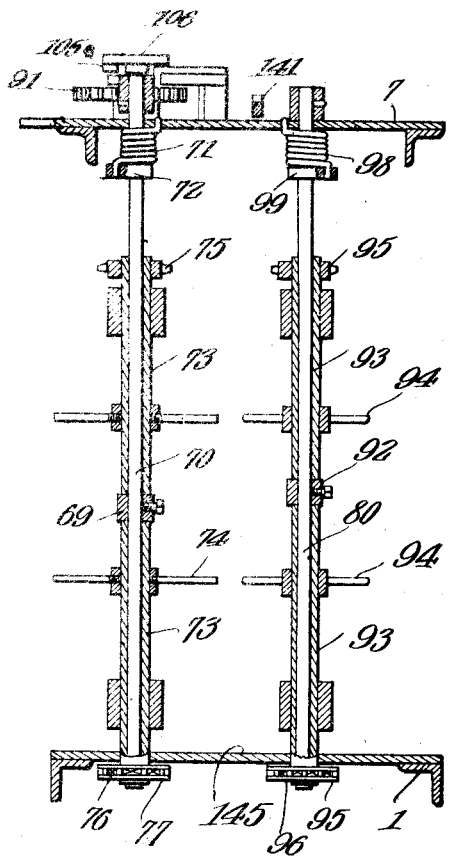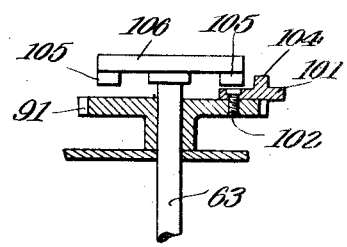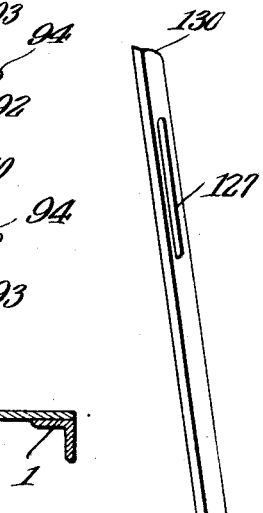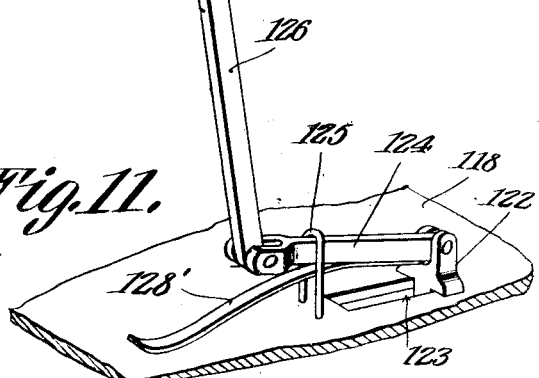

UNITED STATES PATENT OFFICE.

OTTO KLUGE, OF GOLCONDA, ILLINOIS.

HARVESTER.

1,092,721.  Specification of Letters Patent.  Patented Apr. 7, 1914.

Application filed March 28, 1912.  Serial No. 686,918.

*To all whom it may concern:*

Be it known that I, OTTO KLUGE, a citizen of the United States, residing at Golconda, in the county of Pope and State of Illinois, have invented a new and useful Harvester, of which the following is a specification.

This invention relates to mechanism for harvesting grain such as wheat, oats and rice, one of its objects being to provide mechanism of this type especially designed to be connected to the front end of a motor vehicle and to be propelled forwardly thereby, the motor of the vehicle serving as a means for driving the mechanism of the harvester.

A further object is to provide a machine of this type adapted successively to mow the grain, bind it in sheaves, form the sheaves in shocks and finally deposit the shocks on end upon the ground.

A further object is to provide a machine of this character which will work automatically and which, after the various parts have performed their desired functions, will return all of said parts automatically to their initial positions so that the operation can be repeated indefinitely without any action upon the part of the person operating the motor vehicle.

Another object is to provide improved means for conveying the cut grain from the mowing attachment to the sheaf forming mechanism.

Another object is to provide improved means for forming shocks from the sheaves, said shock forming mechanism including means operable automatically for depositing the shocks on end upon the ground.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a view partly in plan and partly in section of the attachment connected to the front end of a motor vehicle, a portion of said vehicle being shown, that portion of the figure in section being taken along the line *a—b* Fig. 2. Fig. 2 is a section on line *c—d* Fig. 1. Fig. 3 is a section on line *e—f* Fig. 2. Fig. 4 is a section on line *g—h* Fig. 2. Fig. 5 is a view, showing in diagram, the drive mechanism of the machine. Fig. 6 is a plan view of the mechanism employed for tying and ejecting the shocks. Fig. 7 is a rear elevation of the mechanism shown in Fig. 6, certain of the parts being shown in section. Fig. 8 is a side elevation of the mechanism shown in Fig. 7, the position of the platform when tilted, being indicated by dotted lines. Fig. 9 is a section on line *i—k* Fig. 6. Fig. 10 is a section on line *l—m* Fig. 6, the rotating head of the mechanism being shown in elevation. Fig. 11 is a detail view of a portion of the platform tripping mechanism.

Referring to the figures by characters of reference A designates the front portion of a motor vehicle which can be in the form of an ordinary passenger automobile, a tractor, or any other type of motor propelled vehicle. This vehicle has brackets B extending forwardly therefrom and to which the mechanism constituting the present invention is adapted to be pivotally connected. This mechanism includes a frame 1 connected, at intermediate points, to the brackets B by means of rearwardly extending arms 2. This frame 1 can be of any construction desired so as to be sufficiently durable and rigid and is supported at its ends and at one or more intermediate points, by ground wheels 3 whereby it can travel easily over the ground while being propelled by the motor vehicle. Standards 4 and 5 are mounted on the end portions of the frame 1 and intermediate standards are arranged along the back edge of the frame 1, as indicated at 6, these standards 4, 5 and 6 serving to support the top frame 7 of the structure.

An upwardly and rearwardly inclined shaft 8 is journaled in the top and bottom frames close to the end standard 4 and carries a series of sprockets 9 engaged by superposed endless chains 10 having outstanding curved fingers 11. These chains also engage sprockets 12 secured to a shaft 13 which is journaled in the top and bottom frames 7 and 1 and is perpendicular to the bottom frame. Thus it will be seen that those portions of the front flights of the chains 10 adjacent the standard 4 occupy an inclined plane and that said flights gradually merge into a vertical plane where they engage the sprockets 12.

The bottom frame 1 carries a platform 14 in front of the chains 10, this platform being inclined downwardly and rearwardly and merging into an upstanding back plate 15 which projects back of the front flight of the lower chain 10. This platform 14 thus constitutes a ledge on which cut grain is adapted to rest and the back plate 15 prevents the grain or other material from passing along the platform 14 rearwardly from the machine. A finger bar 16 is arranged in front of the platform 14 and guards 17 are located at the ends thereof, there being a sickle bar 18 mounted to reciprocate upon the finger bar.

The shaft 13 is located adjacent the center of the frame 1 and has a beveled gear 19 which meshes with another gear 20 secured to one end of a shaft section 21 journaled in a bearing 22 carried by the rear portion of the frame 1. This shaft section has a crank 23 which transmits motion, through a pitman 24, to a lever 25 fulcrumed between its ends, as at 26, upon the bottom of the frame 1 and connected at its forward end to the sickle bar 18 so that, as shaft section 21 rotates, the chains 10 will be simultaneously actuated so that the teeth or projections 11 on the front flights thereof will move toward the center of the frame 1 while, at the same time, the sickle bar will be reciprocated, thereby cutting the grain in the path thereof and causing it to fall back upon the support or backing made up of the plate 15 and the chains 10.

The shaft section 21 is connected, by means of a universal joint 27, to another shaft section 28 which, in turn, is connected by a universal joint 29, to a shaft 30 constituting means for transmitting motion from the motor of the vehicle A. This power transmitting mechanism constitutes no part of the present invention but may be of that type disclosed in a co-pending application filed by me in the United States Patent Office on March 14, 1912, Serial No. 683,784.

Shaft 13 has a gear 31 secured thereto above the gear 19 and which meshes with another gear 32 secured to the lower end of an upstanding shaft 33 which, as shown particularly in Fig. 1, has a series of curved packing arms extending therefrom, as indicated at 34. These arms work through slots 35 formed in the front wall 36 of the sheaf compartment 37 of the machine and secured to the inner face of this wall and extending longitudinally thereof, are spring fingers 38 adapted to press the grain yieldingly toward another series of fingers 39 formed of spring metal and which are arranged longitudinally along the upstanding rear wall 40 of the compartment 37. The front wall 36 extends from a point close to the shaft 33 and toward the discharge side of the attachment while the rear wall of the compartment 37 extends from a point close to the sprockets 12 and is inclined slightly toward the front wall 36 so as to slightly choke the compartment 37.

Binding mechanism of any well known type is to be used for binding the grain into sheaves as it enters the compartment 37. A portion of this mechanism has been indicated at 41 back of the rear wall 40 of the compartment 37, the needle shaft being indicated at 42. Another portion of the binding mechanism has been indicated at 43 in front of the front wall 36 and includes an arm 44 designed to eject the sheaves after they are formed so as to force them longitudinally within compartment 37 and between the spring holding fingers 38 and 39. The shaft 45 to which this arm 44 is connected, receives its motion through mechanism not shown, and has a disk 46 which drives a pitman 47 and crank 48. Said crank actuates the needle shaft 42.

The mechanism of the binder is preferably driven by a shaft 49 carrying upper and lower sprockets 50. One of the sprockets 50 receives motion, through a chain 51, from a sprocket 52 on shaft 13 and the other sprocket 50 transmits motion, through a chain 53, to a sprocket 54 which is secured to the lower end of a shaft 55 journaled within the top and bottom frames 7 and 1. A gear 56 is secured to this shaft 55 and meshes with another gear 57 secured to a shaft 58 which is located directly in front of and parallel with the shaft 55. These two shafts carry sprockets 59 on which are mounted endless chains 60 carrying projecting teeth or fingers 61. Said chains engage sprockets 62 mounted on shafts 63 which are parallel with each other and with the shafts 55 and 58. These shafts 63 and 55 and 58 are located outside of the passage 64 extending from the compartment 37 between the front and rear walls 36 and 40, and said walls have slots therein, as indicated at 65, and through which the inner or active flights of the chains 60 project so as to bring the teeth or fingers 61 into engagement with the sheaves within the passage.

The bottom and top frames 1 and 7 are enlarged at the discharge end of the attachment, the bottom frame being extended forwardly as shown at 66 in Fig. 1. The front wall 36 of the passage 64 is extended between these enlarged portions of the frames and is provided with a curved portion 67, the axis of curvature being perpendicular to the frames 1 and 7 and the convex surface of the curved portion being in front. This curved portion extends practically throughout the width of the enlarged portions of the frames and has a space 68 adapted to receive a curved compressing finger 69 normally extending across the outlet end of the passage 64 and secured at one end to the middle portion of a shaft 70 which is journaled in the top and bottom frames of the machine. A coiled spring 71 is connected at one end to a lug 72 outstanding from the upper end of the shaft 70 and, at its other end, to the top frame 7, this spring serving to hold the arm or finger 69 normally in the position indicated by full lines in Fig. 1. Sleeves 73 are mounted for rotation upon the shaft 70 above and below the arm 69, as shown in Fig. 9 and these sleeves carry radial packing fingers 74. A sprocket 75 is connected to the upper end of the upper sleeve 73 and another sprocket 76 is connected to the lower end of the lower sleeve 73. The upper and lower sprockets 75 and 76 are adapted to be driven by chains 77 which, in turn, receive motion from sprockets 78 on the upper and lower portions of the forward shaft 63. A finger 79 extends radially from the upper end of shaft 70 and is for the purpose hereinafter set forth. Arranged back of the shaft 70 is another shaft 80 provided, at its upper end, with arms 81 and 82, arm 82 being provided with a slide 83 which is pivotally connected thereto and mounted to work within a guide 84. An anti-friction roller 85 is carried by the free end of the slide 83 and is located in the path of a cam 86 secured to and rotating with a shaft 87. A large gear 88 rotates with the shaft 87 and receives motion, through gears 89 and 90, from a gear 91 loose on the front shaft 63. (See Fig. 6). The shaft 80 has a curved retaining arm 92 secured to the middle portion thereof so as to rotate therewith and mounted loosely on this shaft 80 above and below the arm 92 are sleeves 93 each of which carries a series of packing fingers 94 and a sprocket 95. The fingers 94 are disposed directly opposite the fingers 74 and the sprockets 95 are arranged directly opposite the sprockets 75 and 76 respectively. These sprockets 95 receive motion, through chains 96, from sprockets 97 secured to the rear shaft 63.

It will be seen that the two shafts 70 and 80 are located at opposite sides of the outlet end of the passage 64 and rotate in opposite directions so that the packing fingers 74 and 94 will operate to push the sheaves into the space between the finger 69 and the finger 92. A spring 98 is coiled about the upper end portion of the shaft 80 and has one end secured to a lug 99 fastened to the shaft while the other end of the spring is secured to the top frame 7. Thus the spring serves to hold the finger 92 normally closed, at which time its free end bears against the curved front wall 67 of the shock forming portion of the machine. The shaft 87 and the front shaft 63 carry parts of the binding and knotting mechanism, the knotter being indicated generally at 100 in Figs. 2 and 8. The arm or finger 69 and the lug 79 which moves with this arm constitute a releasing element as will be hereinafter described. The loose gear 91 has an angular lever 101 pivotally mounted thereon, as indicated at 102, this lever being held normally in a predetermined position by a spring pressed catch 103 mounted on the top frame 7. A lug 104 is mounted on the lever 101 and, when said lever is engaged by the catch 103, this lug is held out of the path of studs 105 which extend downwardly from and rotate with a head 106 secured to and revoluble with the front shaft 63. A spring 107 connects lever 101 to the gear 91 so that, when the lever is released from the catch 103, said spring 107 will swing the lever on the gear 91 so as to bring the lug 104 into the path of one of the projections 105 on the head 106. Under normal conditions the shaft 63 rotates freely and the lug 104 will not be engaged by the projections 105. Thus it will be seen that gear 91 is normally stationary. The needle 108 of the shock binding mechanism is secured to a shaft 109 which is arranged close to and parallel with the standard 5 and is journaled in brackets 109'. This needle 108 is of the usual form and coöperates with the knotter 100, it being understood that the means for tying the cord constitutes no part of the present invention except that it enters broadly into the combination. A crank arm 110 extends from the upper end portion of the shaft 109 and is connected, by a pitman 111, to the gear 88. Thus it will be seen that each time gear 88 makes one complete rotation, needle 108 will be swung across the space back of the wall 67 so as to coöperate with the knotting mechanism 100 and will move back to its initial position, indicated by full lines in Figs. 1, 2 and 6.

Arranged within the extension or enlargement 66 of the bottom frame 1 is a platform 112 made up of a frame 113 open at its back end and provided with parallel fingers 114 extending from the front end of the frame and beyond the back or open end thereof. Trunnions 115 extend laterally from the front end of the frame 113 and are journaled within the enlargement 66. The rear end portions of the frame 113 have locking bolts 116 extending through them and into openings 117 formed in the sides of the enlargement 66 of the bottom frame 1. This structure is clearly shown in Fig. 7. The ends of the bolts are preferably beveled so that said bolts can be readily guided into the openings 117 when the platform is raised after being tilted in the manner hereinafter described. The bolts 116 are arranged under a floor 118 which is arranged on a frame 113 directly opposite the outlet end of the passage 64 and extends throughout the width of the frame and up to the curved wall 67. A lever 119 is fulcrumed under this floor and is connected at its ends to the bolts 116 by means of links 120. A spring 121 may be mounted on one of the bolts so as to hold both of said bolts normally projected beyond the sides of the platform frame.

A slide 122 is mounted in a slot 123 in one side of the floor 118 and is connected at one end to one of the bolts 116 and, at its other end, to a link 124. This link is movably mounted within a guide 125 extending upwardly from the floor 118 and is pivotally attached to the lower end of a lever 126 having a longitudinal slot 127 in the upper end portion thereof. A spring 128' is arranged under the link 124 and serves to hold the lever 126 normally elevated, as shown in Fig. 11. The slotted portion of the lever 126 extends through a bracket 128 and a pivot pin 129 is arranged in this bracket and projects through the slot 127. Thus it will be seen that the lever 126 is free to swing on the pin 129 as a fulcrum and can also move upwardly and downwardly relative thereto. The upper end of lever 126 is preferably beveled, as shown at 130 and lies in the path of a cam 131 which rotates with the needle shaft 109.

A bracket 132 is connected to the standard 5 and frame 1 and a spring 133 is suspended from this bracket and is connected to one side of the platform frame 113. This spring is sufficiently strong to hold the platform elevated or in normal position as long as it is not loaded. When, however, a shock is formed on the platform the spring 133 is not strong enough to hold the platform in raised position. At this time the bolts 116 serve as supports for the platform.

The ground wheel 3 located at the delivery side of the machine is preferably journaled upon a spindle 134 extending from an arm 135 pivotally connected to the lower extension or enlargement 66, as shown at 136. A toothed segment 137 may be carried by the spindle 134, the toothed portion of said segment being concentric with the pivot 136. This segment may be engaged by a worm 138 connected to one end of a crank shaft 139. Thus it will be seen that by means of this crank shaft the arm 135 can be swung relative to the enlargement 66 thus to raise or lower the delivery side of the machine. It is to be understood of course that any other suitable means than those described may be provided for effecting this adjustment of the side portion of the machine.

As hereinbefore pointed out the attachment constituting the present invention is designed to be secured to the front end of a motor propelled vehicle and to receive motion through the shaft sections 30, 28 and 21 from the motor of the vehicle. When shaft 21 is rotated it actuates the sickle bar 18 through the pitman 24 and the lever 25 so that, as the machine moves forward, the grain in the path of the sickle will be cut and deposited on end upon the ledge or platform 14. The upstanding grain will lean back upon the endless chains 10 and the teeth or projections 11 carried by these chains will convey the grain, while in upstanding position, along the platform 14 and into the path of the packing fingers 34. These fingers are constantly rotating with the shaft 33 which receives motion through gears 32, 31, 19 and 20, from shaft 21. Thus the cut grain will be packed into the compartment 37 between the converging walls 36 and 40 and while in this compartment will be acted on by the binding mechanism and tied in sheaves, this binding mechanism being indicated at 41, 42, 43, 44 and 45 and receiving motion through shaft 49 and lower sprocket 50 from chain 51 and sprocket 52. As has already been stated the mechanism of this binder can be of any suitable type and the said binder constitutes no part of the present invention except as considered broadly in the combination disclosed.

It has not been deemed necessary to enter into detail as to the construction of the binding and tying mechanism, under the circumstances and reference as to the operation of the parts can be had to the ordinary McCormick binders.

As the sheaves are finished within the compartment 37 they are forced longitudinally between the spring fingers 38 and 39 by the arm 44 and are then engaged by the teeth or projections 61 on the endless sheaf chains 60. These chains are operating continuously, motion being transmitted to their shafts 55 and 58 through the upper sprocket 50, chain 53, sprocket 54, and the gears 56 and 57 (see Fig. 5). As each sheaf arrives between the shafts 70 and 80 it is engaged by the rotating fingers 74 and 94 which are driven by the chains 77 and 96 from sprockets on the shafts 63. Thus each sheaf, as it comes between the said shafts 70 and 80 will be pushed against the spring pressed finger 69 and will cause said finger to move gradually back toward the space 68 in the wall 67. After enough sheaves have been forced into the space between the wall 67 and the finger 92 to move the finger 69 back into the space 68, the lug or projection 79, which moves with the finger 69, strikes against the catch 103 and thus disengages it from the spring drawn lever 101. Said lever is thus shifted automatically by its spring 107 so as to bring the projection 104 into the path of one of the lugs or projections 105 on the head 106, it being understood that this head constantly rotates with the front shaft 63. Obviously, therefore, the gear 91 thus becomes coupled to the shaft 63 and is caused to rotate therewith. Motion is therefore transmitted through the gears 90 and 89 to the large gear 88 and as this gear rotates it actuates the pitman 111 so as to draw the needle 108 around into operative relation with the knotting mechanism 100 and thence back to its initial position. During the return movement of the needle the cam 86, which rotates with gear 88, moves against the anti-friction roller 85 and shifts the slide 83 longitudinally, thus causing the arm 82 to rotate shaft 80 and move the retaining finger 92 backwardly away from the shock which has been tied and against the stress of spring 98. At the same time the arm 81 is swung into engagement with the beveled head 140 of a catch 141 in the form of an elongated lever fulcrumed, as at 142, upon the top 7 of the machine. This catch has a rod 143 pivotally connected to one end thereof and extending downwardly into contact with the platform 112. Suitable guides, such as indicated at 144 may be provided for the rod 143.

As the finger 92 swings back away from the shock, there is nothing further necessary to remove the shock from the machine except to tilt the platform 112 so as to permit the shock to slide off of the platform and onto the ground. This operation is accomplished in the following manner: During the movement of the needle 108 toward the knotting mechanism, the cam 131 passes over the beveled upper end of the lever 126 and slightly depresses it, spring 128′ serving to promptly elevate the lever 126 to its initial position after the cam has passed the beveled end 130. During the return movement of the needle 108 to its initial position as indicated in full lines in Fig. 6, the cam 131 engages and pushes against the upper end of lever 126, thus causing the lower end of the lever to pull on link 124 which, in turn, pulls on the slide 122. Lever 119 is thus actuated and the two bolts 116 are withdrawn from engagement with the sides of the enlargement 66. As the weight of the shock on the platform is too great to be supported by the spring 133, it will be seen that the platform will promptly swing downwardly about the trunnions 115 and as the rear portion of the shock extends beyond the rear edge of the floor 118, it will be seen that said rear portion will contact with the ground between the fingers 114. Therefore, as the machine moves forward, the shock will be pulled off of the floor 118 and fingers 114. As soon as the platform has been relieved of the weight of the shock, the spring 133 will elevate the platform 112 to its normal position so as to cause the bolts 116 to spring back into the openings 117 and thus lock the platform in raised position. At the same time the platform will strike against the lower end of the rod 143 and push upwardly on the latch 141, thus causing its head 140 to move downwardly out of engagement with the arm 81. Spring 98 will thus operate to restore the retaining arm 92 to its initial or closed position, as shown in Figs. 1 and 6 and the slide 83 will be restored to the position shown in Fig. 6. As the shocks are to leave the floor 118 while the platform 112 is being withdrawn from under said shocks, the spring controlled finger 69 starts to swing backwardly to its initial position across the discharge end of the passage 64. During this movement of the finger the lug 79 moves away from the catch 103 and said catch is thus swung toward the gear 91 by its spring so as to engage the projecting end of the lever 101 and swing it relative to the gear 91, thereby to remove the lug 104 from the path of the lug or projection 105 on the head 106. The operation of the needle will thus be brought to a stop while shaft 63 will continue to rotate as before. Thus all of the parts of the mechanism will be reset and other sheaves can be caused to accumulate upon the floor 118 after which the tying and delivering operation hereinbefore described will be repeated.

It is to be understood that the passage 64 and the compartment 37 is provided with a continuous floor which may be a continuation of the platform 14 and may also aline with the floor 118, The floor of the passage 64 has been indicated at 145.

Although the part 67 has been called a wall, it is to be understood that this need not be a solid structure but can be made up of spaced strips, as shown more particularly in Figs. 2 and 8. The same may be true also of the walls of the passage 64.

What is claimed is:—

1. An agricultural machine including harvesting mechanism, means for supporting grain in an upstanding position after being cut, bundle forming mechanism at one side of the harvesting mechanism, shock forming mechanism at one side of the bundle forming mechanism, a conveyer for carrying cut grain on end from the harvesting mechanism to the bundle forming mechanism, and a conveyer for carrying the bundles on end to the shock forming mechanism.

2. An agricultural machine including harvesting mechanism, means for supporting grain in an upstanding position after being cut, bundle forming mechanism at one side of the harvesting mechanism, shock forming mechanism at one side of the bundle forming mechanism, a conveyer for carrying cut grain on end from the harvesting mechanism to the bundle forming mechanism, and a conveyer for carrying the bundles on end to the shock forming mechanism, the grain being moved along substantially straight lines transversely of the path of the machine from the harvesting mechanism to the shock forming mechanism.

3. An agricultural machine including a wheel supported platform extending transversely of the path of movement thereof, harvesting mechanism at the front of the platform adjacent one side, mechanism upon the platform adjacent the center thereof for forming bundles on end, mechanism at the other side of the platform for forming shocks on end, a conveyer for carrying cut grain on end along the platform from the harvesting mechanism to the bundle forming mechanism, and a conveyer for carrying bundles on end along the platform from the bundle forming mechanism to the shock forming mechanism.

4. An agricultural machine including a wheel supported platform extending transversely of the path of movement thereof, harvesting mechanism at the front of the platform adjacent one side, mechanism upon the platform adjacent the center thereof for forming bundles on end, mechanism at the other side of the platform for forming shocks on end, a conveyer for carrying cut grain on end along the platform from the harvesting mechanism to the bundle forming mechanism, a conveyer for carrying bundles on end along the platform from the bundle forming mechanism to the shock forming mechanism, a drive shaft extending rearwardly from the platform, and separate means actuated thereby for actuating the harvesting, bundle forming and shock forming mechanisms and conveyers all in properly timed relation.

In testimony that I claim the foregoing as my own, I have hereto affixed my signature in the presence of two witnesses.

OTTO KLUGE.

Witnesses:
 THOS. H. CLARK,
 DAISY V. McCOY.